United States Patent
Osawa

[11] Patent Number: 6,167,160
[45] Date of Patent: Dec. 26, 2000

[54] ENCODING AND DECODING METHODS AND DEVICES, AND IMAGE PROCESSING APPARATUS USING THE SAME

[75] Inventor: Hidefumi Osawa, Kawaguchi, Japan

[73] Assignee: Canon Kabushiki Kaisha, Tokyo, Japan

[21] Appl. No.: 09/167,575

[22] Filed: Oct. 7, 1998

[30] Foreign Application Priority Data

Oct. 8, 1997 [JP] Japan .................................. 9-276079

[51] Int. Cl.[7] ...................................................... G06K 9/00
[52] U.S. Cl. ........................................... 382/247; 382/238
[58] Field of Search ..................................... 382/232, 233, 382/234, 235, 236, 237, 238, 239, 240, 241, 242, 243, 244, 245, 246, 247, 248, 249, 250, 251, 276, 277, 278

[56] References Cited

U.S. PATENT DOCUMENTS

| | | | |
|---|---|---|---|
| 4,905,297 | 2/1990 | Langdon, Jr. et al. | 382/56 |
| 5,402,248 | 3/1995 | Sato et al. | 358/426 |
| 5,732,157 | 3/1998 | Osawa | 382/244 |
| 5,812,146 | 9/1998 | Sato et al. | 345/501 |
| 5,848,198 | 12/1998 | Penn | 382/276 |
| 5,861,892 | 1/1999 | Sato et al. | 345/435 |
| 5,991,449 | 11/1999 | Kimura et al. | 382/238 |

*Primary Examiner*—Bijan Tadayon
*Assistant Examiner*—Amir Alavi
*Attorney, Agent, or Firm*—Fitzpatrick, Cella, Harper & Scinto

[57] ABSTRACT

Coding efficiency is improved by adopting dynamic probability estimation, and the adaptation rate is adjusted by a minimum number of times by adding means for detecting a change in predicted state of encoding, thereby shortening encoding/decoding time.

In an arithmetic encoding/decoding method for updating a cumulative probability when the generation frequency of a symbol to be encoded/decoded exceeds an allowable maximum value, an entropy associated with the generation state of the symbol to be encoded/decoded is calculated when the generation frequency has exceeded the allowable maximum value (S103), it is determined if the currently calculated entropy and previously calculated entropy have a significant difference (S104), and the cumulative probability is updated when it is determined that the two entropy values have the significant difference (S105).

16 Claims, 7 Drawing Sheets

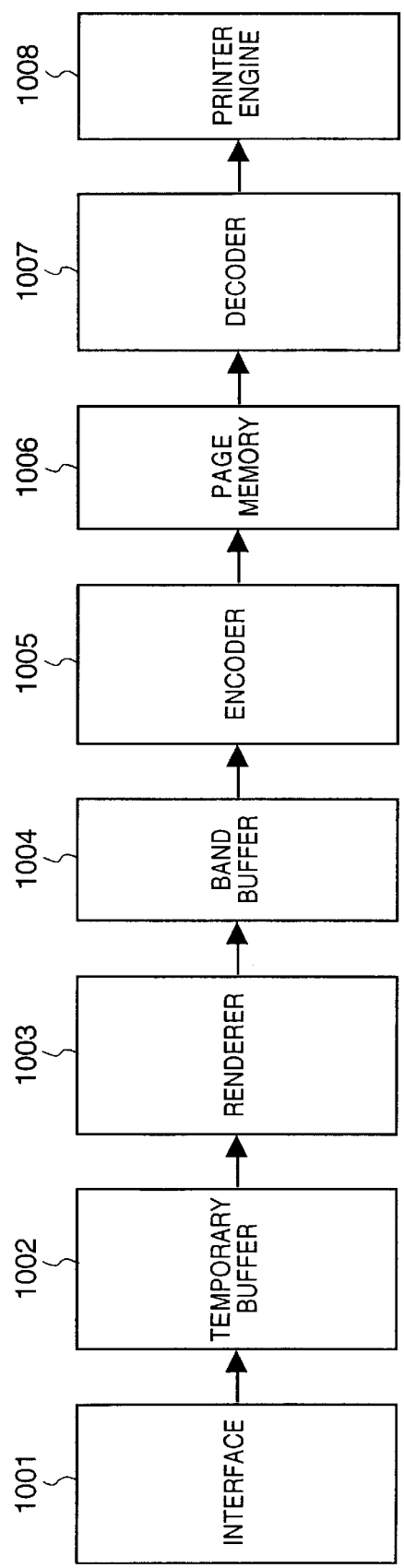

ENCODING AND DECODING METHODS AND DEVICES, AND IMAGE PROCESSING APPARATUS USING THE SAME

BACKGROUND OF THE INVENTION

The present invention relates to encoding and decoding methods and devices, and an image processing apparatus using the same.

In image coding for a conventional image equipment, a method of performing actual arithmetic coding after the frequency distribution of generated symbols are calculated in units of states to obtain a cumulative probability value required for arithmetic encoding is known. As an example of such multi-valued or multialphabet arithmetic coding, a method described in IEICE transaction IE96-9 (1996-05), the Institute of Electronics, Information and Communication Engineers is known.

In the above article, arithmetic coding using approximation by some parts per the n-th power of 2 is adopted. The contents of this coding will be explained below. (Probability Approximation Algorithm)

Let N be the number of types of symbols to be encoded, and $p_i$ ($0 \leq i \leq N-1$) be the probability of occurrence of symbol i. When a probability is approximated by some parts per the n-th power of 2, a probability approximation parameter $Q'_i$ for symbol i is determined by:

$$Q'_i = \begin{cases} [2^n P_{N-1}] & (i = N-1) \\ \left[2^n \sum_{j=i}^{N-1} P_j\right] - \sum_{j=i+1}^{N-1} Q'_j & (i \neq N-1) \end{cases} \quad (1)$$

where [X] is the integral part of X. The same applies to the following description.

Assume that an approximate probability is determined in descending order of indices, i.e., from i=N-1 to 0, and $Q'_i=1$ is set when $p_i \geq 0$ and $Q'_i < 1$.

Since actual encoding/decoding uses an cumulative approximate probability, an cumulative approximate probability parameter $Q_i$ is calculated from $Q'_i$ by:

$$Q_i = \sum_{j=0}^{i} Q'_j \quad (2)$$

In this way, since a probability approximation error is carried over to the approximate probability of the next symbol, probability errors do not accumulate. Also, since processing for determining the approximate probability from symbols with lower occurrence probabilities is used together, the approximate probability of a symbol with a low probability of occurrence can be prevented from becoming 0 or less.

(Encoding Algorithm)

The actual encoding sequence will be described below. Let N be the number of types of symbols to be encoded, and the probability be approximated by some parts per the n-th power of 2. The cumulative approximate probability parameter $Q'_i$ has already been calculated by equations (1) and (2) above. Note that the register length used in arithmetic operations is V=2n bits. This is because the number of effective digits requires 2n bits since an n-bit multiplication is done upon calculating augend A.

The encoding process algorithm is as follows.
[S11] Initialization $C \leftarrow 0, A \leftarrow 2^n - 1$

[S12] Encode Symbol k $A_0 \leftarrow A \times Q_{k-1}$ $A \leftarrow (Q_k - Q_{k-1})$ $C \leftarrow C + A_0$ for $Q_{k-1}=0$ when k=0.

[S13] Renormalize

A is shifted to the right until its upper n bits become 0→the number of times of shift is r.

C is shifted to the left by n−r bits to determine the bit overflowing from the register as a code output.

[S12] and [S13] repeat themselves for all the symbols. The final contents of register C are output, thus ending encoding.

(Decoding Algorithm)

The decoding process algorithm is substantially the same as encoding, and is as follows.

[S21] Initialization $C \leftarrow V$ bits from the beginning of a code sequence $A \leftarrow 2^n - 1$

[S22] Calculate Decoded Symbol $C' \leftarrow [C/A]$

Minimum k that satisfies $C' < Q_k$ is the decoded symbol.

[S23] Subtract from Code Sequence $C \leftarrow C - A \times Q_{k-1}$ $A \leftarrow A \times (Q_k - Q_{k-1})$ for $Q_k - 1 = 0$ when k=0.

[S24] Renormalize

A is shifted to the right until its upper n bits become 0→the number of times of shift is r.

C is shifted to the left by n−r bits, and in synchronism with bit shift, a code sequence is input to register C from its LSB and is determined to be a code input.

In the above reference, encoding and decoding are done in this way. With this method, arithmetic operations are made using an identical cumulative probability value for an image for at least one frame.

However, since this method can only attain average coding throughout the sequence, it cannot optimally encode an information source, the symbols of which change from the middle of the sequence.

As one scheme for solving this problem, dynamic probability estimation may be adopted to improve coding efficiency. As such dynamic coding, the following method is known. That is, in case of, e.g., abinary information source, the MAX and MIN values of the accumulated frequencies of input symbols are obtained, and when each of MAX and MIN value has exceeded a preset value, the accumulation frequency of each symbol is nearly halved to adjust the adaptation rate (see U.S. Pat. No. 5,025,258).

However, when adaptation of a binary information source is directly applied to multi-valued information, that adaptation must be done in units of bits of multi-valued information, and adjustment of adaptation rate takes place frequently, resulting in too long an encoding/decoding time.

SUMMARY OF THE INVENTION

It is an object of the present invention to improve coding efficiency by adopting dynamic probability estimation and to shorten the encoding/decoding time by adjusting the adaptation rate by a minimum number of times by providing means for detecting changes in predicted state of coding.

In order to achieve the above object, according to the present invention, an arithmetic encoding/decoding method for updating a cumulative probability when a generation frequency of a symbol to be encoded/decoded exceeds an allowable maximum value, comprises the steps of: calculating an entropy associated with a generation state of the symbol to be encoded/decoded when the generation frequency has exceeded the allowable maximum value; checking if a currently calculated entropy and previously calculated entropy have a significant difference; and updating the cumulative probability when it is determined that the two entropy values have the significant difference.

Also, in a predictive encoding/decoding method including an arithmetic encoding/decoding method for updating a cumulative probability when a generation frequency of a symbol to be encoded/decoded exceeds an allowable maximum value, the arithmetic encoding/decoding method comprises the steps of: calculating an entropy associated with a generation state of the symbol to be encoded/decoded when the generation frequency has exceeded the allowable maximum value; checking if a currently calculated entropy and previously calculated entropy have a significant difference; and updating the cumulative probability when it is determined that the two entropy values have the significant difference. Furthermore, the method further comprises the steps of: classifying states of the symbols to be encoded/decoded on the basis of predicted states of pixels around a pixel to be encoded/decoded; and counting the generation frequency in units of states.

According to the present invention, an arithmetic encoding/decoding device for updating a cumulative probability when a generation frequency of a symbol to be encoded/decoded exceeds an allowable maximum value, comprises: entropy calculation means for calculating an entropy associated with a generation state of the symbol to be encoded/decoded when the generation frequency has exceeded the allowable maximum value; and updating means for checking if a currently calculated entropy and previously calculated entropy have a significant difference, and updating the cumulative probability when it is determined that the two entropy values have the significant difference.

Also, in a predictive encoding/decoding device including an arithmetic encoding/decoding unit for updating a cumulative probability when a generation frequency of a symbol to be encoded/decoded exceeds an allowable maximum value, the arithmetic encoding/decoding unit calculates an entropy associated with a generation state of the symbol to be encoded/decoded when the generation frequency has exceeded the allowable maximum value, checks if a currently calculated entropy and previously calculated entropy have a significant difference, and updates the cumulative probability when it is determined that the two entropy values have the significant difference. The device further comprises state classifying means for classifying states of the symbols to be encoded/decoded on the basis of predicted states of pixels around a pixel to be encoded/decoded, and means for counting the generation frequency in units of states.

According to the present invention, in an image processing apparatus for storing an image encoded by an encoding device, and outputting the image decoded by a decoding device, the encoding/decoding device includes an arithmetic encoding/decoding unit for updating a cumulative probability when a generation frequency of a symbol to be encoded/decoded exceeds an allowable maximum value, and the arithmetic encoding/decoding unit calculates an entropy associated with a generation state of the symbol to be encoded/decoded when the generation frequency has exceeded the allowable maximum value, checks if a currently calculated entropy and previously calculated entropy have a significant difference, and updates the cumulative probability when it is determined that the two entropy values have the significant difference. Note that the encoding/decoding device further comprises state classifying means for classifying states of the symbols to be encoded/decoded on the basis of predicted states of pixels around a pixel to be encoded/decoded, and means for counting the generation frequency in units of states.

With the above arrangement, since a cumulative probability calculation required for coding is made only when the occurrence frequency has exceeded the maximum value and the statistical state of a symbol to be encoded has changed due to generation of an entropy calculation value difference, efficient coding can be achieved by minimum required updating.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram showing an example of the arrangement of an image processing apparatus according to the embodiment of the present invention.

DETAILED DESCRIPTION OF THE PREFERRED EMBODIMENTS

First Embodiment

Figure 1:
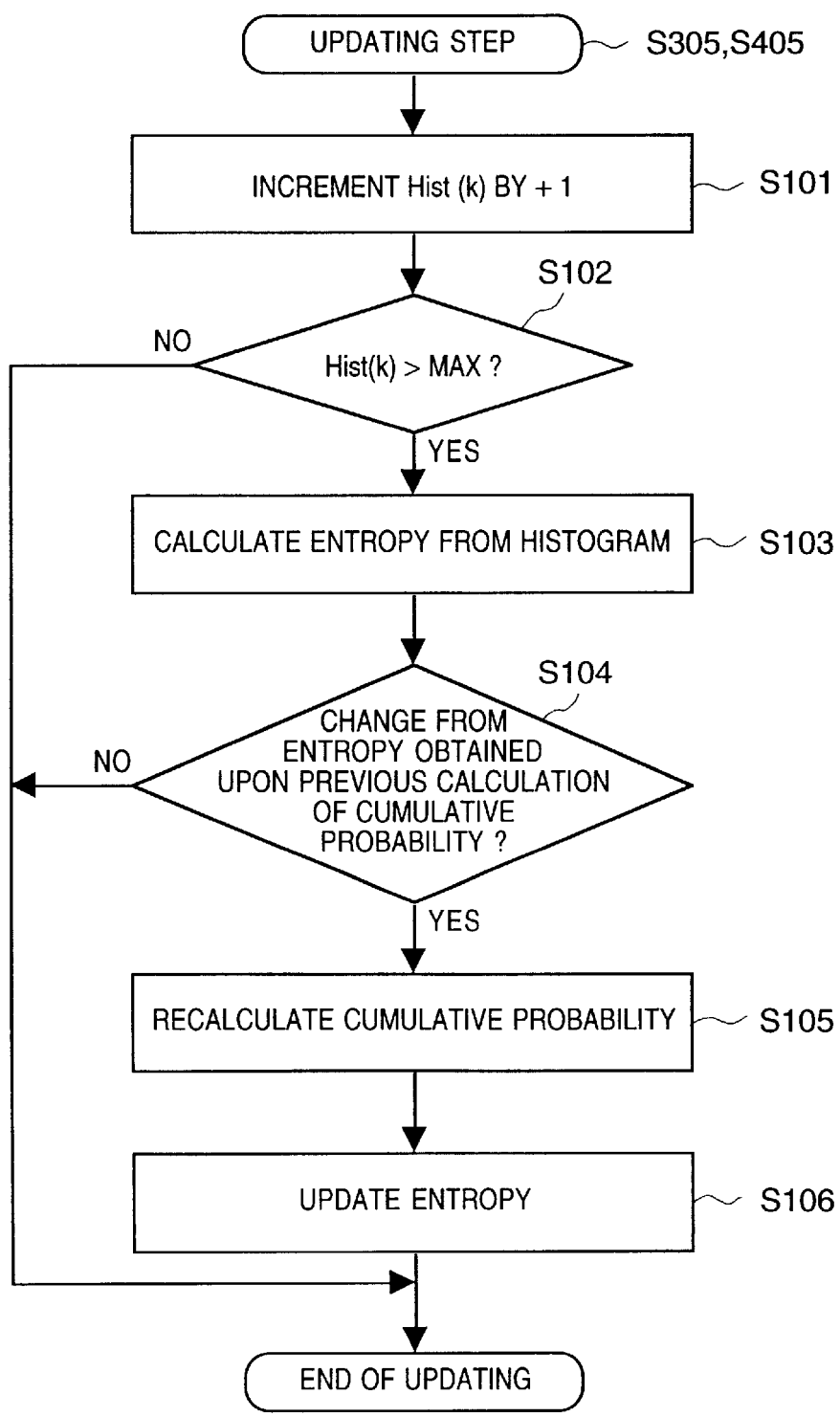
FIG. 1 is a flow chart showing updating according to an embodiment of the present invention.

FIG. 7 shows an image forming apparatus as an example of an image processing apparatus that uses the encoding and decoding methods of this embodiment.

In FIG. 7, data received from a computer is sent via, in the order of reference numerals, an interface unit 1001 for receiving data from the computer, a temporary buffer 1002 for temporarily storing the data received from the computer, a renderer 1003 for rendering and mapping the data received from the computer to multi-valued information, e.g., 4-bit multi-valued data per pixel expressed by 32 gradation levels, a band buffer 1004 on which the renderer writes the rendered and mappedmulti-valued data, an encoder 1005 forcompressing and encoding the multi-valued data on the band buffer, a page buffer 1006 for storing the data compressed and encoded by the encoder, and a decoder 1007 for decoding the encoded data in the page buffer, and is finally output to a printer engine 1008 for printing out the decoded multi-valued data. Note that a plurality of band buffers 1004 may be equipped to parallelly process mapping of the renderer 1003 and encoding of the encoder 1005, thus attaining high-speed processing.

As an encoding scheme for the encoder 1005, a compression scheme, which can assure a given worst-case compression ratio for arbitrary data (text, graphics, images, and the like) to meet a strong cost reduction requirement and to minimize the page memory capacity, is demanded. As such compression scheme, an encoding/decoding method of this embodiment having a function of learning two-dimensional features of multi-level data to be compressed is used.

Figure 2:
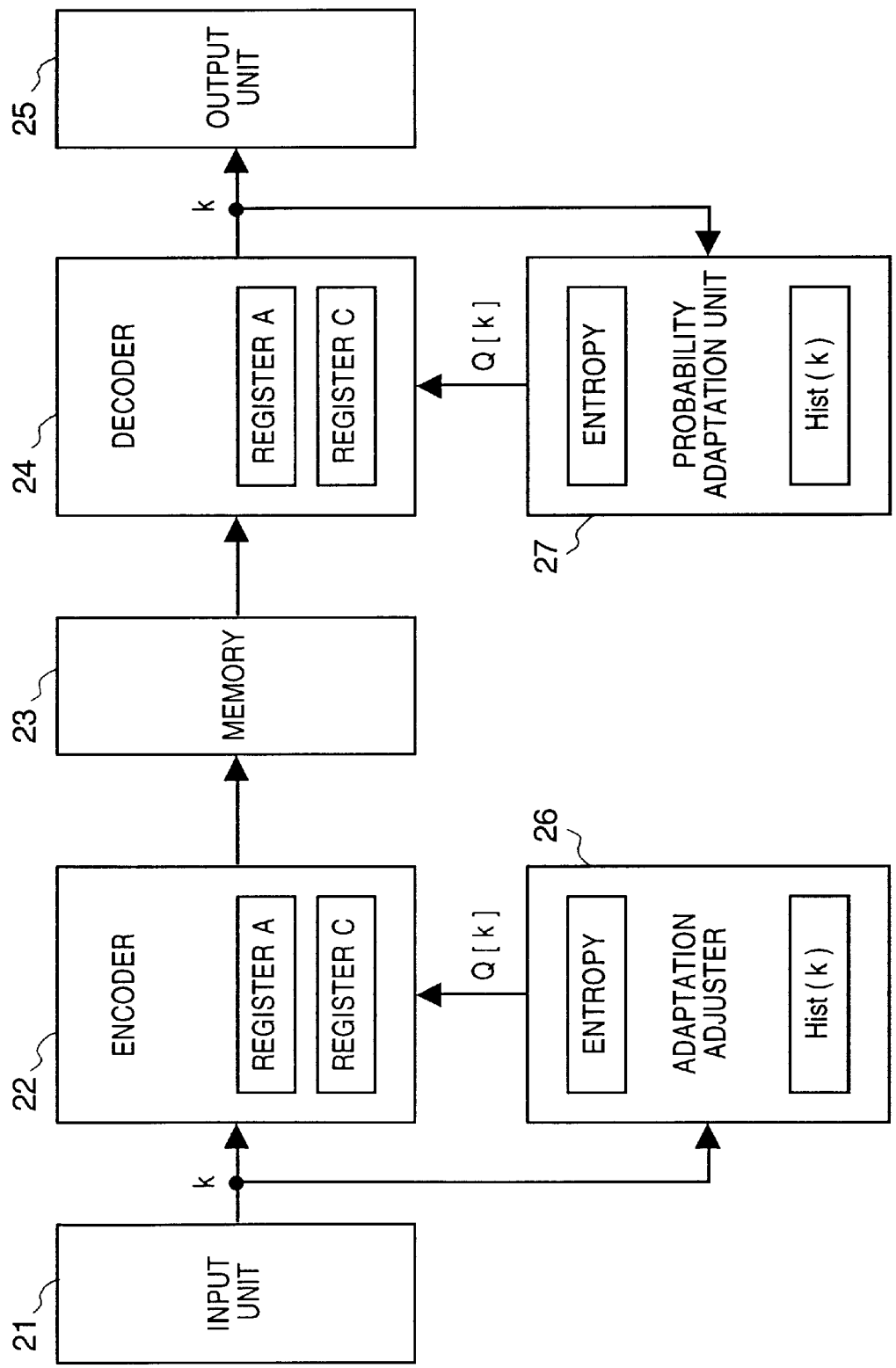
FIG. 2 is a diagram showing the flow of encoding/decoding.

FIG. 2 is a block diagram showing an example of the arrangement of image encoding and decoding devices of this embodiment. In FIG. 2, an image input unit 21 corresponds to the arrangement before the band buffer 1004 in FIG. 7, an encoder 22 and adaptation adjuster 26 correspond to the encoder 1005, a memory 23 corresponds to the page memory 1006, a decoder 24 and probability adaptation unit 27 correspond to the decoder 1007, and an output unit 25 corresponds to the printer engine 1008, respectively.

Symbol k to be encoded as multi-valued information (k=0, . . . , N−1; N is the number of types of symbols to be encoded) input from the image input unit 21 is supplied to the encoder 22 and adaptation adjuster 26. In the encoder 22, encoding progresses by the processing shown in the flow chart in FIG. 3 to be described later. The encoder 22 encodes using register A (normally used as an interval size register), and register C (normally used as a code register). The adaptation adjuster 26 executes processing corresponding to updating (step S305 in FIG. 3) shown in FIG. 1 to be described later. The adaptation adjuster 26 accumulates the Hist(k) representing the number of times of generation of each symbol k to be encoded, and provides the value of an cumulative approximate probability Q[k] as an encoding parameter in arithmetic processing (step S303 in FIG. 3).

The memory 23 stores data encoded by the encoder 22, and the stored encoded data is read out from the memory 23 for decoding.

Figure 4:
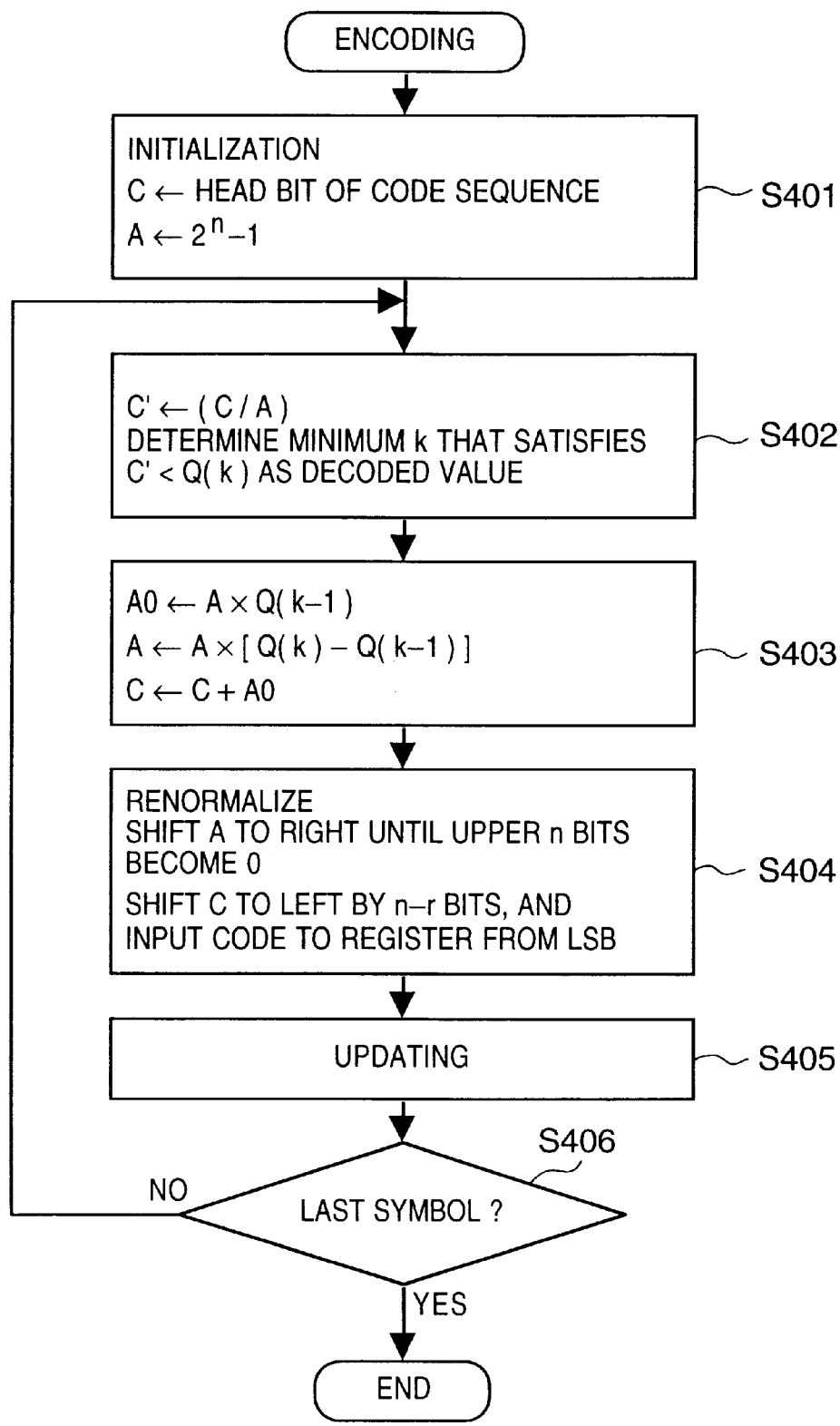
FIG. 4 is a flow chart showing the processing sequence of decoding.

The decoder 24 decodes as shown in FIG. 4 (to be described later). The decoded data is supplied to the probability adaptation unit 27 to calculate an cumulative approximate probability Q[k] as the same decoding parameter as the adaptation adjuster 26.

Figure 3:
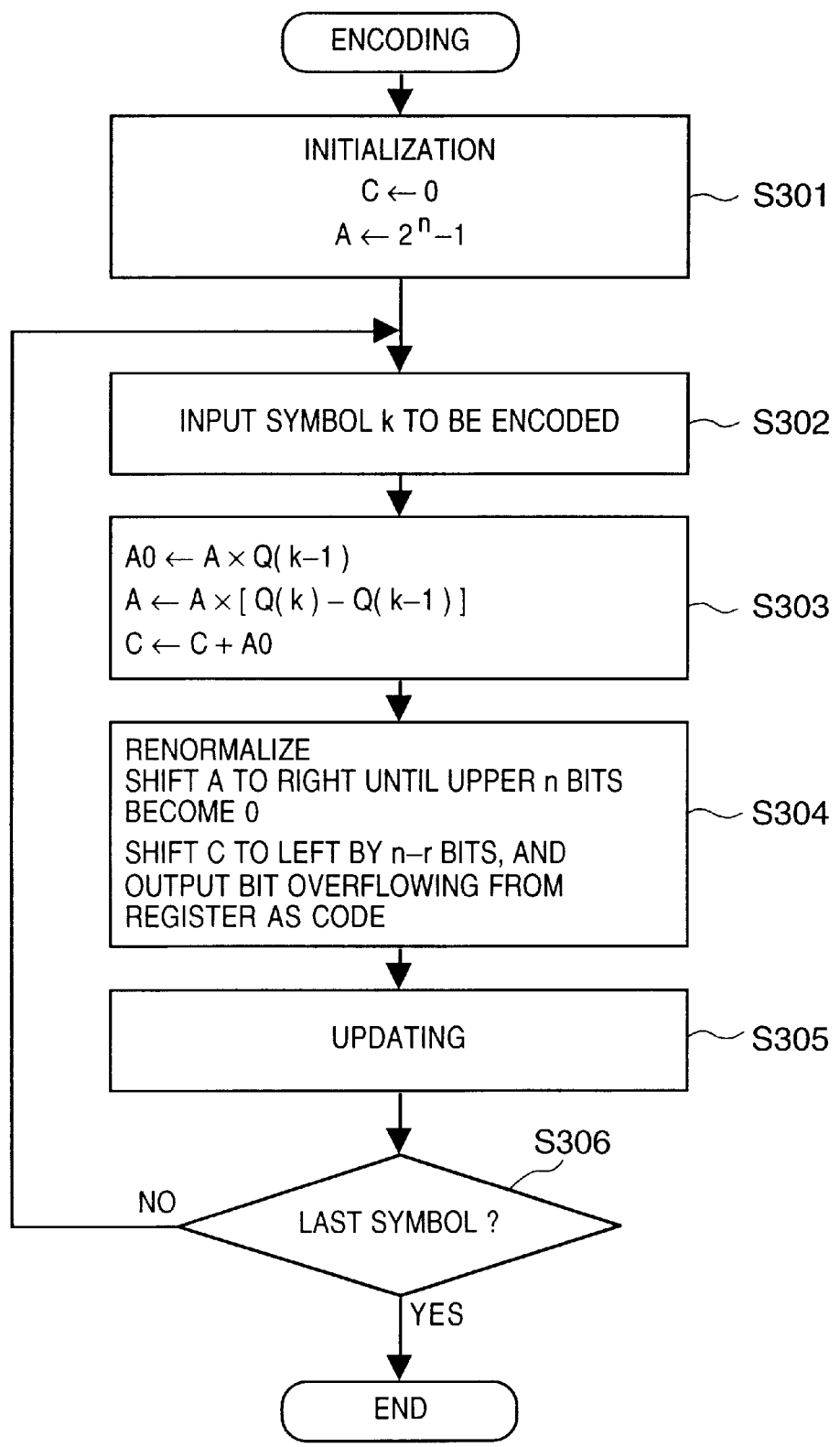
FIG. 3 is a flow chart showing the processing sequence of encoding.

FIG. 3 is a flow chart showing encoding by the encoder 22 and adaptation adjuster 26. In this embodiment, the register length of registers C and A is V=2n, and n=12.

In step S301, two registers C and A used for encoding are initialized. That is, 0 is set in C and $(2^n-1)$ is set in A as binary values. In step S302, symbol k to be encoded is input from the input unit 21. In step S303, $A_0$ is calculated: $A_0 \leftarrow A \times Q[k-1]$, A is recalculated: $A \leftarrow A \times (Q[k]-Q[k-1])$, and C is updated: $C \leftarrow C+A_0$. Q[k] is an encoding parameter as an cumulative approximate probability for symbol k to be encoded. Note that $(Q[i]-Q[i-1])$ is the difference between the i-th cumulative probability Q[i] and (i−1)-th cumulative probability Q[i−1], and represents the probability of occurrence of i.

In renormalization in step S304, the contents of register A are shifted so that upper n bits of register A become 0 (the number of times of shift is r). The contents; of register C are shifted to the left by (n−r) bits, and the bit overflowing from the register becomes an output code. After that, code fixing for preventing a sign from changing due to ripple carry upon calculation of $C+A_0$ is inserted, but this is not the subject of the present invention, and a detailed description thereof will be omitted.

In step S305, updating of this embodiment (to be described later) is performed. Until it is determined in step S306 that encoding for all the symbols to be encoded is complete, the flow returns to step S302 to repeat the processing.

FIG. 4 is a flow chart showing decoding by the decoder 24 and probability adaptation unit 27.

In step S401, two registers C and A used for decoding are initialized. In this embodiment, assume that the register length is V=2n, and n=12 as in encoding. That is, the first bit of a code is set in C and $(2^n-1)$ is set in A as binary values. In step S402, C'←the integral part of C/A (to be referred to as [(C/A)] hereinafter) is calculated, and minimum k that satisfies C'<Q[k] is determined as a decoded symbol value. In step S403, $A_0$ is calculated: $A_0 \leftarrow A \times Q[k-1]$, A is recalculated: $A \leftarrow A+(Q[k]-Q[k-1])$, and C is updated: $C \leftarrow C-A_0$.

In renormalization in step S404, the contents of register A are shifted so that upper n bits of register A become 0 (the number of times of shift is r). Also, encoded data is input from its LSB while the contents of register C are shifted to the left by (n−r) bits.

In step S405, updating of this embodiment (to be described later) is performed. Until it is determined in step S406 that decoding for all the pixels is complete, the flow returns to step S402 to repeat the processing.

FIG. 1 is a flow chart showing updating (S305, S405) used in this embodiment in detail.

In step S101, the Hist(k) representing the number of times of generation of each symbol k is counted up. In step S102, it is checked if this count value exceeds a preset value MAX. If the count value has exceeded the preset value MAX, a probability p of occurrence of the corresponding symbol is obtained from the number of Hist(k) as a histogram, and an entropy is calculated using the obtained value, in step S103.

In this example, the entropy is calculated by:

Entropy=$\Sigma(-p*\log_2(p))$

However, the present invention is not limited to such specific equation.

In step S104, it is determined if the previously calculated entropy and new entropy for an identical symbol have a significant difference therebetween. Only when a significant difference is detected, an cumulative approximate probability Q[k] is recalculated in step S105.

Figure 5:
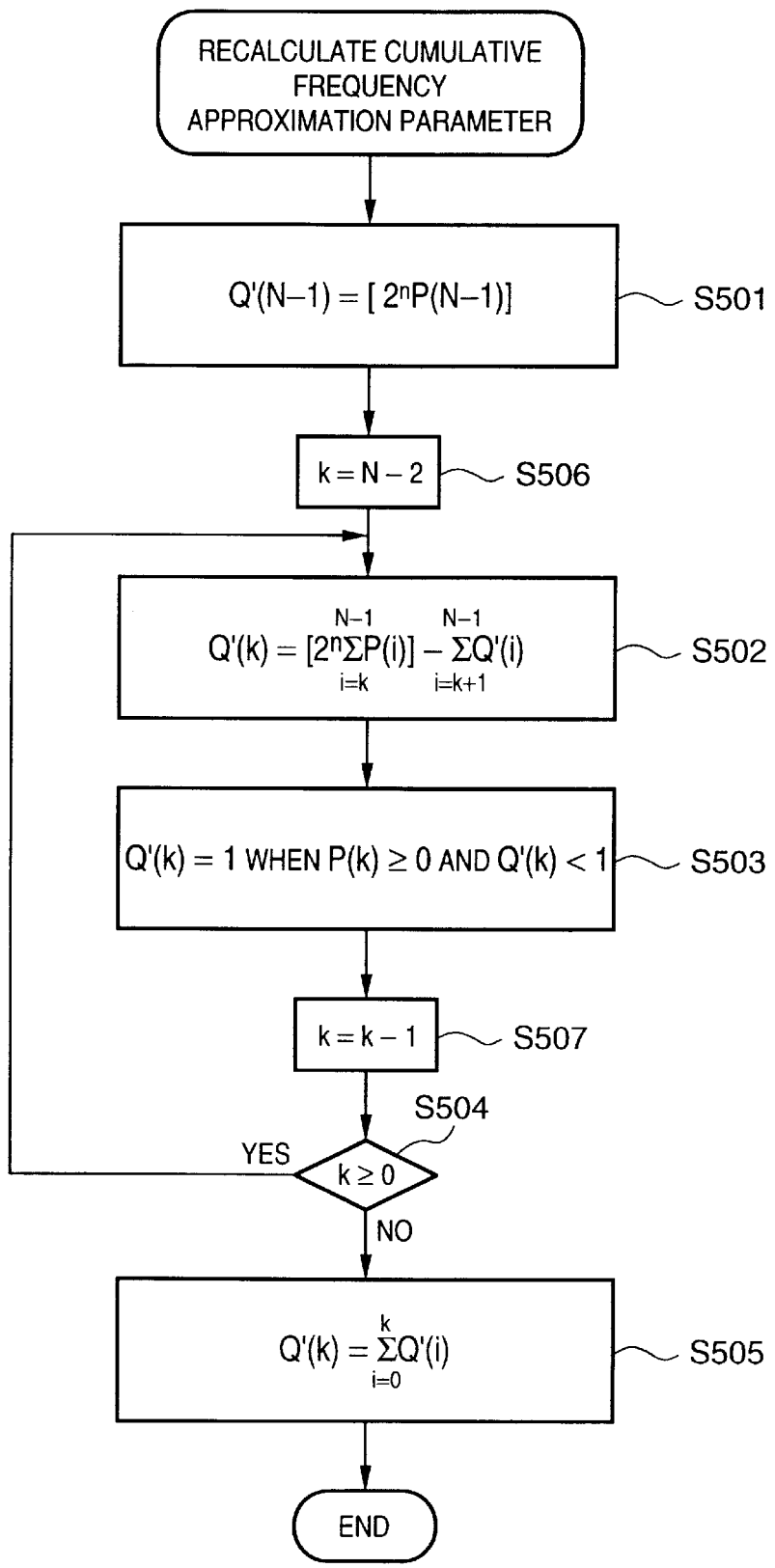
FIG. 5 is a flow chart showing the processing sequence of a calculation of an accumulated frequency approximation parameter.

FIG. 5 is a flow chart showing the calculation flow of Q[k]. FIG. 5 shows the probability approximation algorithm. The calculation is made as follows.

In case of a probability approximation parameter for symbol k, $Q[N-1]=[(2^n \times p[N-1])]$ is calculated for k=N−1 in step S501.

In steps S506, S502, S503, S507, and S504, Q'[k] is calculated from k=N−2 to k=0 by:

$$Q'[k] = \left[2^n \sum_{i=k}^{N-1} p[i]\right] - \sum_{i=k+1}^{N-1} Q'[i] \quad (k \neq N-1) \quad (3)$$

In step S503, Q'[k]=1 is set when p[k]>0 and Q'[k]<1.
In step S505, the cumulative approximate probability parameter Q[k] is calculated by:

$$Q[k] = \sum_{i=0}^{k} Q'[i] \quad (4)$$

As described above, the Q[k] calculation requires long processing time since it includes many loop calculations. However, since the recalculation is made only when the state (entropy value in this embodiment) has changed, minimum required updating can lead to high-speed processing.

Note that the encoding and decoding sequences are shown in the flow charts, but the individual building elements may be implemented by either software or hardware.

Second Embodiment

Figure 6:
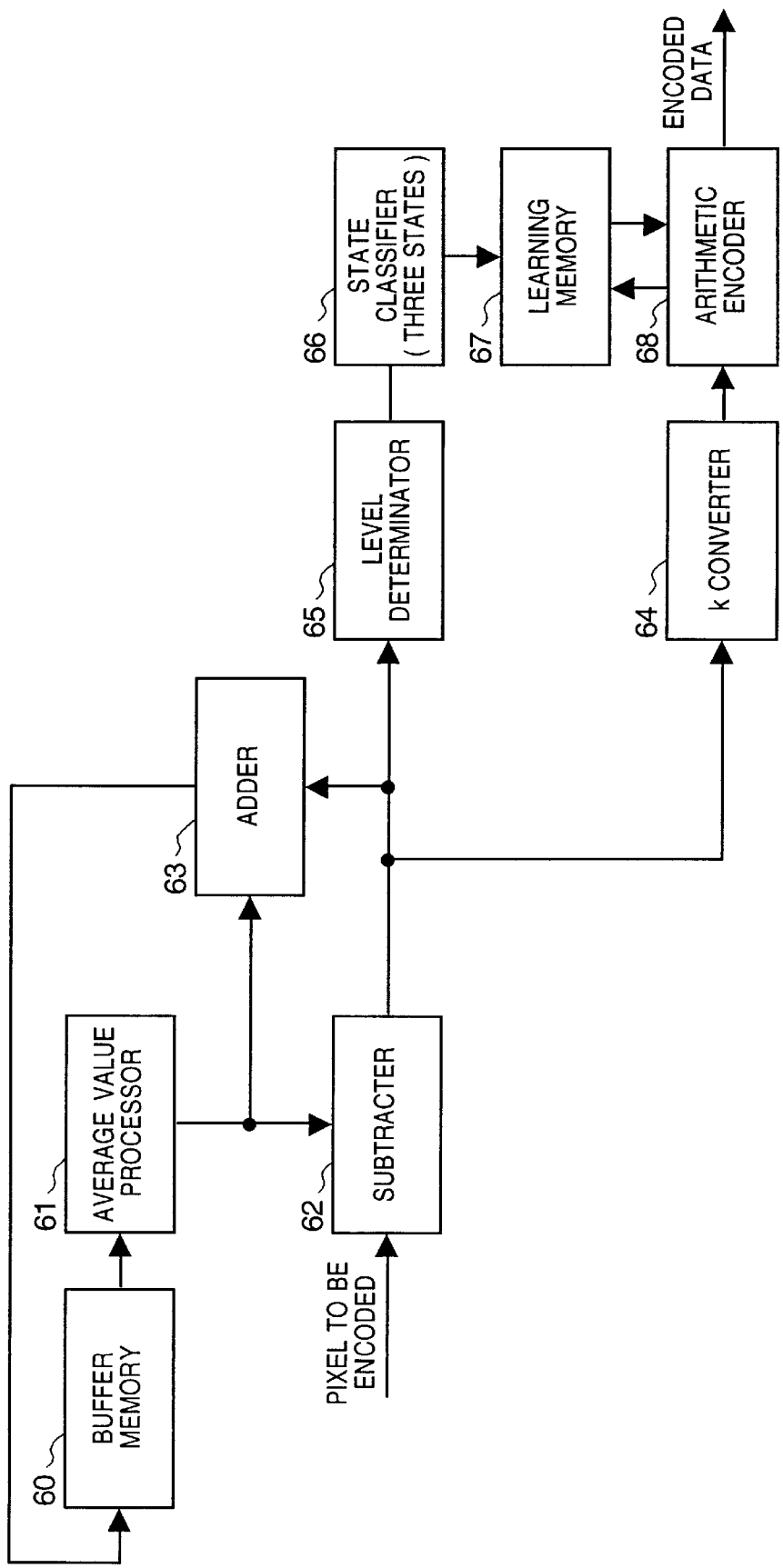
FIG. 6 is a diagram showing an example using predicted state classification according to the first embodiment of the present invention.

FIG. 6 shows an example in which the above-mentioned arithmetic coding is applied to predictive coding. In this example, a plurality of predicted states are classified depending on the state of reference pixels, the count value of the number of times of generation, cumulative probability Q, and entropy value are saved in a learning memory 67 in units of states, and an arithmetic encoder 68 executes the aforementioned encoding using these values.

In predictive coding of this embodiment, the difference between the average value of surrounding pixels (e.g., upper and left neighboring pixels of a pixel to be encoded), and that pixel to be encoded is calculated, and is encoded. A subtracter 62 calculates the difference between the output from an average value processor 61 and the pixel to be encoded, and the calculated difference is supplied to a level determinator 65, k converter 64, and adder 63. Note that a buffer memory 60 and the adder 63 are prepared for obtaining the average of the surrounding pixels.

The k converter 64 converts the difference into an integer (symbol k mentioned above) ranging from 0 to N−1, and the arithmetic encoder 68 encodes it. The level determinator 65 classifies the magnitudes of the differences into five levels (−large, −small, 0, +small, and +large), and stores them in a state classifier 66. The state classifier 66 determines the predicted state of the pixel to be encoded with reference to the level determination values of the upper and left neighboring pixels of the pixel to be encoded. For example, the classifier 66 classifies the predicted state into the following three states: state a when the determined levels of both the upper and left neighboring pixels are 0; state c when the level determination values of both the upper and left neighboring pixels are either −large or +large; and in all other cases, state b.

The number of times of generation of symbol k from the k converter is counted in units of these three states to calculate the cumulative approximate probability Q [k]. The arithmetic encoder 68 encodes symbol k using this Q[k].

Note that the present invention may be applied to either a system constituted by a plurality of equipments (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

The present invention can provide encoding and decoding methods and devices, which can improve coding efficiency by adopting dynamic probability estimation, and can shorten the encoding/decoding time by adjusting the adaptation rate by a minimum number of times by adding means for detecting a change in predicted state of encoding, and an image processing apparatus using the same.

As many apparently widely different embodiments of the present invention can be made without departing from the spirit and scope thereof, it is to be understood that the invention is not limited to the specific embodiments thereof except as defined in the appended claims.

What is claimed is:

1. An arithmetic encoding method for updating a cumulative probability when a generation frequency of a symbol to be encoded exceeds an allowable maximum value, comprising the steps of:

calculating an entropy associated with a generation state of the symbol to be encoded when the generation frequency has exceeded the allowable maximum value;

determining if a currently calculated entropy and previously calculated entropy have a significant difference; and updating the cumulative probability when it is determined that the two entropy values have the significant difference.

2. A predictive encoding method including an arithmetic encoding method for updating a cumulative probability when a generation frequency of a symbol to be encoded exceeds an allowable maximum value, said arithmetic encoding method comprising the steps of:

calculating an entropy associated with a generation state of the symbol to be encoded when the generation frequency has exceeded the allowable maximum value;

determining if a currently calculated entropy and previously calculated entropy have a significant difference; and updating the cumulative probability when it is determined that the two entropy values have the significant difference.

3. The method according to claim 2, further comprising the steps of:

classifying states of the symbols to be encoded/decoded on the basis of predicted states of pixels around a pixel to be encoded; and counting the generation frequency in units of states.

4. An arithmetic encoding device for updating a cumulative probability when a generation frequency of a symbol to be encoded exceeds an allowable maximum value, comprising:

entropy calculation means for calculating an entropy associated with a generation state of the symbol to be encoded when the generation frequency has exceeded the allowable maximum value; and updating means for checking if a currently calculated entropy and previously calculated entropy have a significant difference, and updating the cumulative probability when it is determined that the two entropy values have the significant difference.

5. A predictive encoding device including an arithmetic encoding unit for updating a cumulative probability when a generation frequency of a symbol to be encoded exceeds an allowable maximum value, wherein said arithmetic encoding unit:

calculates an entropy associated with a generation state of the symbol to be encoded when the generation frequency has exceeded the allowable maximum value;

determines if a currently calculated entropy and previously calculated entropy have a significant difference; and updates the cumulative probability when it is determined that the two entropy values have the significant difference.

6. The device according to claim 5, further comprising:

state classifying means for classifying states of the symbols to be encoded on the basis of predicted states of pixels around a pixel to be encoded; and means for counting the generation frequency in units of states.

7. An arithmetic decoding method for updating a cumulative probability when a generation frequency of a symbol to be decoded exceeds an allowable maximum value, comprising the steps of:

calculating an entropy associated with a generation state of the symbol to be decoded when the generation frequency has exceeded the allowable maximum value;

determining if a currently calculated entropy and previously calculated entropy have a significant difference; and updating the cumulative probability when it is determined that the two entropy values have the significant difference.

8. A predictive decoding method including an arithmetic decoding method for updating a cumulative probability when a generation frequency of a symbol to be decoded exceeds an allowable maximum value, said arithmetic decoding method. comprising the steps of:

calculating an entropy associated with a generation state of the symbol to be decoded when the generation frequency has exceeded the allowable maximum value;

determining if a currently calculated entropy and previously calculated entropy have a significant difference; and updating the cumulative probability when it is determined that the two entropy values have the significant difference.

9. The method according to claim 8, further comprising the steps of:

classifying states of the symbols to be decoded on the basis of predicted states of pixels around a pixel to be decoded; and counting the generation frequency in units of states.

10. An arithmetic decoding device for updating a cumulative probability when a generation frequency of a symbol to be decoded exceeds an allowable maximum value, comprising:

entropy calculation means for calculating an entropy associated with a generation state of the symbol to be decoded when the generation frequency has exceeded the allowable maximum value; and updating means for checking if a currently calculated entropy and previously calculated entropy have a significant difference, and updating the cumulative probability when it is determined that the two entropy values have the significant difference.

11. A predictive decoding device including an arithmetic decoding unit for updating a cumulative probability when a generation frequency of a symbol to be decoded exceeds an allowable maximum value, wherein said arithmetic decoding unit:

calculates an entropy associated with a generation state of the symbol to be decoded when the generation frequency has exceeded the allowable maximum value;

determines if a currently calculated entropy and previously calculated entropy have a significant difference; and updates the cumulative probability when it is determined that the two entropy values have the significant difference.

12. The device according to claim 11, further comprising:

state classifying means for classifying states of the symbols to be decoded on the basis of predicted states of pixels around a pixel to be decoded; and means for counting the generation frequency in units of states.

13. An image processing apparatus for storing an image encoded by an encoding device, and outputting the image decoded by a decoding device, said encoding device including an arithmetic encoding unit for updating a cumulative probability when a generation frequency of a symbol to be encoded exceeds an allowable maximum value, wherein said arithmetic encoding unit:

calculates an entropy associated with a generation state of the symbol to be encoded when the generation frequency has exceeded the allowable maximum value;

determines if a currently calculated entropy and previously calculated entropy have a significant difference; and updates the cumulative probability when it is determined that the two entropy values have the significant difference, and said decoding device including an arithmetic decoding unit for updating a cumulative probability when a generation frequency of a symbol to be decoded exceeds an allowable maximum value, wherein said arithmetic decoding unit:
calculates an entropy associated with a generation state of the symbol to be decoded when the generation frequency has exceeded the allowable maximum value;
determines if a currently calculated entropy and previously calculated entropy have a significant difference; and
updates the cumulative probability when it is determined that the two entropy values have the significant difference.

14. The apparatus according to claim 13, wherein said encoding device further comprises state classifying means for classifying states of the symbols to be encoded on the basis of predicted states of pixels around a pixel to be encoded, and means for counting the generation frequency in units of states, and said decoding device further comprises state classifying means for classifying states of the symbols to be decoded on the basis of predicted states of pixels around a pixel to be decoded, and means for counting the generation frequency in units of states.

15. A method for updating a cumulative probability when a generation frequency of a symbol to be encoded or decoded exceeds an allowable maximum value in an arithmetic encoding or decoding method, comprising the steps of:

calculating an entropy associated with a generation state of the symbol to be encoded or decoded when the generation frequency has exceeded the allowable maximum value;
determining if a currently calculated entropy and previously calculated entropy have a significant difference; and
updating the cumulative probability when it is determined that the two entropy values have the significant difference.

16. A storage medium which computer-readably stores a program for performing arithmetic encoding and decoding that updates a cumulative probability when a generation frequency of a symbol to be encoded or decoded exceeds an allowable maximum value, said program including the steps of:
calculating an entropy associated with a generation state of the symbol to be encoded or decoded when the generation frequency has exceeded the allowable maximum value;
determining if a currently calculated entropy and previously calculated entropy have a significant difference; and
updating the cumulative probability when it is determined that the two entropy values have the significant difference.

* * * * *